United States Patent [19]
Courault

[11] Patent Number: 6,040,990
[45] Date of Patent: Mar. 21, 2000

[54] PRACTICAL STRUCTURE FOR MAKING A MULTILEVEL CONVERTER

[75] Inventor: Jacques Courault, Veneux les Sablons, France

[73] Assignee: Alstom, Paris, France

[21] Appl. No.: 09/267,369

[22] Filed: Mar. 15, 1999

[30]  Foreign Application Priority Data

Mar. 16, 1998 [FR] France ..................... 98 03189

[51] Int. Cl.[7] .................................. H02M 3/18
[52] U.S. Cl. ................................. 363/59; 363/62
[58] Field of Search ................. 363/59, 60, 62; 307/110

[56]  References Cited

U.S. PATENT DOCUMENTS 5,737,201  4/1998  Meynard et al. .............. 363/60
5,940,285  8/1999  Carrere et al. ................ 363/62
5,969,960  10/1999  Tachon et al. ............... 363/60

FOREIGN PATENT DOCUMENTS 2 679 715 A1  1/1993  France .

Primary Examiner—Jessica Han
Attorney, Agent, or Firm—Sughrue, Mion, Zinn Macpeak & Seas, PLLC

[57]  ABSTRACT

A multilevel converter structure made up of cells in cascade, each intermediate cell containing two switches, with one pole of each of the two switches forming part of a pair of upstream poles and the other pole of each of the switches forming part of a pair of downstream poles, the pair of downstream poles of an upstream cell being connected to the pair of upstream poles of a downstream cell, the converter structure also having a respective capacitor for each cell, each capacitor being connected between the two poles constituting the pair of downstream poles of its cell. The converter structure is made up of modules, among which at least an intermediate module contains an upstream capacitor element, in addition to two switches corresponding to the switches of an intermediate cell, the capacitance of said capacitor element being a fraction of the capacitance of the cell capacitor of said upstream cell, while a module upstream from said intermediate module contains a downstream capacitor element whose capacitance is a second fraction of the capacitance of the cell capacitor of said upstream cell.

8 Claims, 2 Drawing Sheets

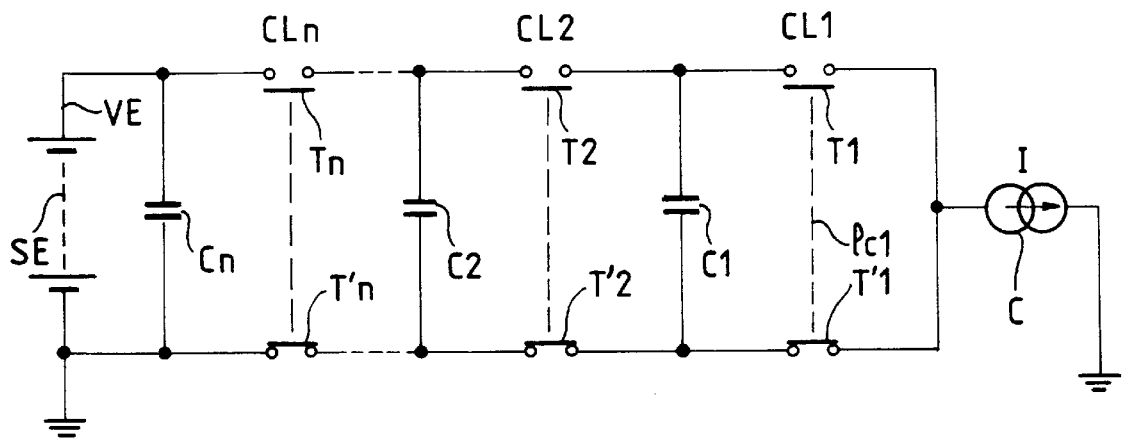
FIG_1 PRIOR ART
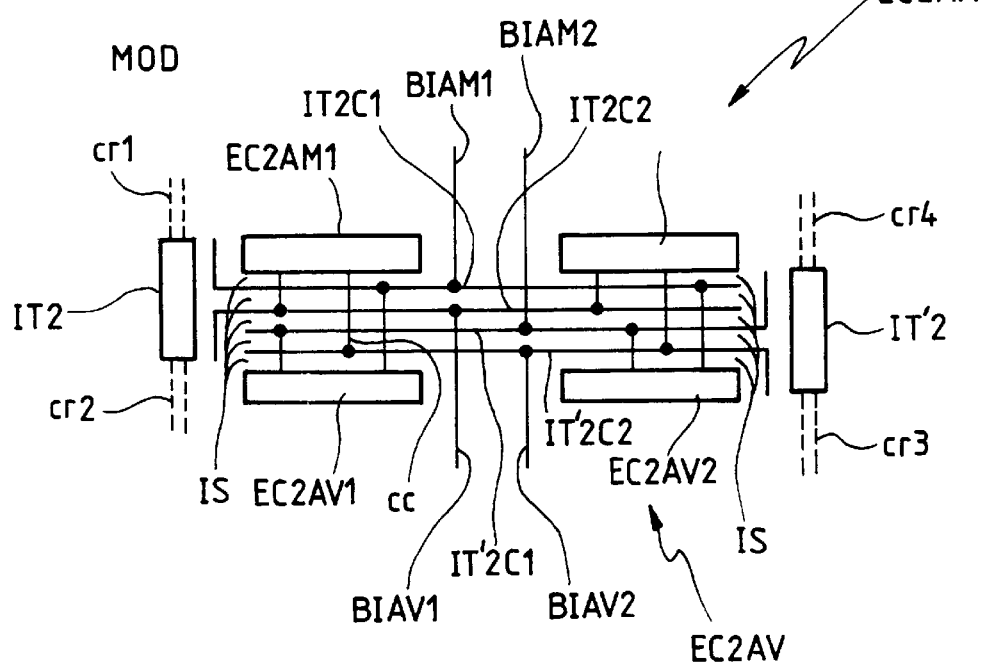
FIG_2

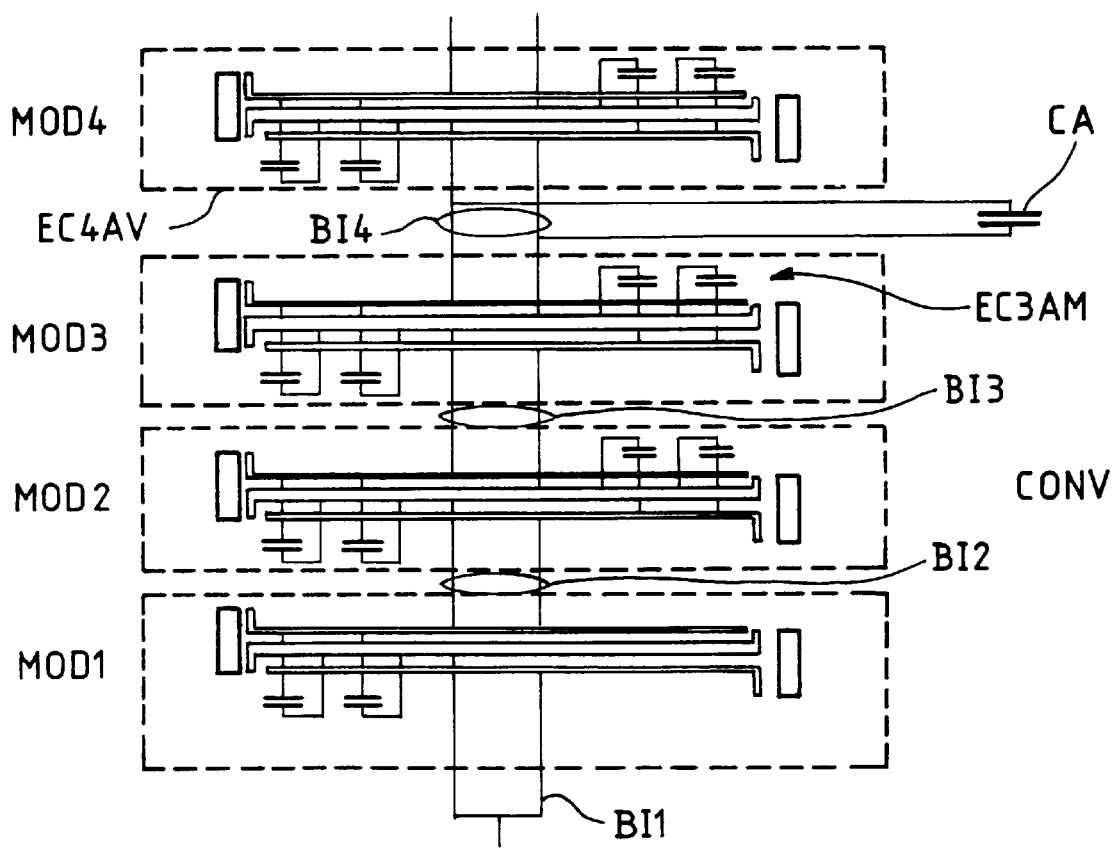

PRACTICAL STRUCTURE FOR MAKING A MULTILEVEL CONVERTER

The present invention relates to electronic circuits for converting electrical energy of the type described in French Patent Application FR-2 679 751 A1.

BACKGROUND OF THE INVENTION

The converter described in that patent application is shown, by way of example, in accompanying FIG. 1. It essentially comprises, between a voltage source SE and a current source C, a succession of controllable switching cells CL1, CL2, . . . , CLn, each having two switches T1, T'1; T2, T'2; . . . ; Tn, T'n, with one pole of each of the two switches forming part of a pair of upstream poles and the other pole of each of the switches forming part of a pair of downstream poles, the pair of downstream poles of an upstream cell being connected to the pair of upstream poles of a downstream cell, and the pair of upstream poles of a first cell CL1 being connected to said current source C, while the pair of downstream poles of a last cell CLn is connected to said voltage source SE, the converter also comprising a respective capacitor C1, C2, . . . , Cn for each cell, each capacitor being connected between the two poles constituting the pair of downstream poles of its cell, the converter further having control means (not shown) governing the nominal operation of the converter and acting on the switches of the successive cells in such a manner that the two switches of any one cell are always in respective opposite conduction states (represented by control links such as lc1), such that in response to a cell control signal delivered by said control means, one of the two switches in a given cell is successively in a first conduction state and then in a second conduction state during a cyclically repeated converter period, and such that in response to cell control signals that are identical but offset in time by a fraction of said converter period, the switches of successive cells function respectively in the same manner but offset in time by said fraction of a period.

Preferably, said fraction of a period is equal to the reciprocal of the number n of cells, i.e. $2\pi/n$, which is optimal with respect to harmonics generated on the output and which enables the voltages charged on the capacitors of the converter to be balanced naturally. Some other offset is nevertheless conceivable.

In such a converter, the successive capacitors C1, C2, . . . , Cn have respective increasing mean charge voltages, the mean charge voltage of the capacitor associated with each of said cells being equal to the product of a voltage VE delivered by said voltage source SE multiplied by the reciprocal of the number of cells in the converter and by the rank of the cell, i.e. VE/3, 2VE/3, VE when n=3, i.e. when the converter has only three cells.

The term "multilevel converter" is used below to designate a converter that satisfies the above description.

The advantage of such a converter is that, under normal operating conditions, each of said switches bears only a fraction of the maximum voltage to which the converter is subjected, i.e. the fraction that corresponds to the difference between the voltages charged on two capacitors of two adjacent cells. Thus, for the switches, it is possible to use components that are less costly and/or faster. If faster components are used, a converter can be made whose operating frequency is higher, which is very advantageous in practice.

In the above description, the inductance of the circuits is not mentioned. In addition, the modular appearance of the converter would encourage the person skilled in the art to implement it in the form of a modular structure, each structural unit corresponding to a respective cell, and containing the two switches of the cell and the cell capacitor connected between the downstream poles of the switches.

Unfortunately, experience has shown that such structural implementations do not satisfy expectations. The inventors have established that transient voltage surges increasing the voltages to be withstood by the switches are caused by the inductance of the conductors between the units of such a modular structure.

OBJECTS AND BRIEF SUMMARY OF THE INVENTION

An object of the invention, which is based on such observations, is to make sure that such inductance does not have such detrimental effects.

The invention is therefore applicable to a multilevel converter structure made up of cells in cascade, each intermediate cell containing two switches, with one pole of each of the two switches forming part of a pair of upstream poles and the other pole of each of the switches forming part of a pair of downstream poles, the pair of downstream poles of an upstream cell being connected to the pair of upstream poles of a downstream cell, the converter structure also having a respective capacitor for each cell, each capacitor being connected between the two poles constituting the pair of downstream poles of its cell.

According to the invention, the converter structure is made up of modules, among which at least an intermediate module contains an upstream capacitor element, in addition to two switches corresponding to the switches of an intermediate cell, the capacitance of said capacitor element being a fraction of the capacitance of the cell capacitor of said upstream cell, while a module upstream from said intermediate module contains a downstream capacitor element whose capacitance is a second fraction of the capacitance of the cell capacitor of said upstream cell.

In this way, the module in question contains a capacitive element connected to each of its pairs of poles and not only a cell capacitor connected to the downstream pair of poles, thereby protecting the switches of the module against voltage surges caused by inductance in the conductors between modules, and in particular in the conductors for connecting to the upstream module.

Advantageously, said first and second fractions are the same for all of the modules of the converter; preferably, all of said fractions are equal to ½. In practice, each of said capacitor elements is made up of a plurality of capacitor units.

Preferably, the connection conductors of the switches are flat busbars and the flat busbars of the switches of a module are superposed on their large faces; the capacitor units are disposed against said stacked busbars.

Similarly, the modules are stacked and interconnected via interconnection flat busbars.

According to another characteristic of the invention, when said capacitance of a cell capacitor is such that a given capacitor element supplying a portion of said capacitance would have a volume exceeding the limits allowed by the required module dimensions, a portion of the cell capacitor capacitance is supplied in the form of an additional capacitor connected to the interconnection busbars coupled to said given capacitor element.

BRIEF DESCRIPTION OF THE DRAWINGS

The various objects and characteristics of the present invention appear more clearly in the following description of embodiments of the invention given by way of non-limiting example and made with reference to the accompanying figures, in which:

FIG. 1, described above, is the simplified circuit diagram of a known multilevel converter;

FIG. 2 shows a multilevel converter module structure of the invention; and

FIG. 3 shows a multilevel converter structure of the invention having a plurality of modules and an additional capacitor.

MORE DETAILED DESCRIPTION

No further reference is made to the electrical description of the multilevel converter shown in FIG. 1, except to mention that a conventional structural implementation of it would comprise identical units, each of which corresponds to one cell of the converter, and thus each of which contains two switches and one cell capacitor, e.g. the switches T2 and T'2 and the capacitor C2. The capacitor C1 would thus belong to a preceding cell. The connections between the upstream poles of the switches T2 and T'T and the downstream poles of the switches T1 and T'1 would thus be connections between modular units, which connections would be relatively long and therefore relatively inductive.

As explained below, the invention consists not only in limiting the inductive nature of the connections but also in making sure that, physically, a capacitive element is connected to the upstream poles of the switches of each cell, so that they are protected from the effects of the inductance of the conductors for connecting to the upstream cell.

More precisely, reference is made to FIG. 2, which shows a multilevel converter module structure MOD of the invention. In addition to containing the two switches of a cell (shown at IT2 and IT'2), this module contains two connection busbars IT2C1 and IT2C2 that are connected to each other by switch IT2 on command (the control means not being shown), two connection busbars IT'2C1 and IT'2C2 that are connected to each other by switch IT'2 on command (the control means not being shown either), an upstream capacitor element EC2AM made up of two capacitor units EC2AM1 and EC2AM2, and a downstream capacitor element made up of two capacitor units EC2AV1 and EC2AV2. Additionally, insulators referenced IS insulate the connection busbars.

The switches are power electronic components, each of which may associate in parallel an Insulated Gate Bilateral Transistor (IGBT) and a rectifier in a housing provided with a liquid cooler. Hence, pipes of a cooling circuit are shown referenced cr1 to cr4. The switch IT2 has two terminals to which respective ones of the connection busbars IT2C1 and IT2C2 are connected. These busbars are copper members of flat rectangular section in order to reduce the magnetic field generated by current, and thus in order to reduce the inductance of the busbar. Since the two connection busbars of the switch IT2 are disposed one above the other, via their large surfaces, and since, at any time, they pass current of equal magnitude and opposite sign, the magnetic field generated is minimized and the apparent inductance of the bars is also minimized. In addition, the two capacitor units EC2AM1 and EC2AM2 forming the capacitor element EC2AM are disposed against the connection busbars, so that the connections of the two capacitor units are as short as possible. The same applies for switch IT'2, busbars IT'2C1 and IT'2C2, and capacitor units EC2AV1 and EC2AV2.

The connection busbars IT2C2 and IT'2C2 correspond to the upstream poles of the cell containing the switches IT2 and IT'2, of cell CL2 in FIG. 1, for example. They are connected by interconnection busbars BIAM1 and BIAM2 to the downstream poles of an upstream module. Both of the capacitor units EC2AM1 and EC2AM2 are connected to these busbars. They are power capacitors and they are rectangular block shaped so as to give a compact shape to the module shown in FIG. 2. The use of two units in parallel to form the capacitor element EC2AM facilitates compactness, and distributes the capacitive decoupling effect procured by the multiple units over the length of the connection busbars. It is possible to provide more than two units.

The busbars IT2C1 and IT'2C1 correspond to the downstream poles of the cell. They are connected by interconnection busbars BIAV1 and BIAV2 to the upstream poles of a downstream module. Both of the capacitor units EC2AV1 and EC2AV2 are connected to these busbars, and the same remarks apply to them.

Advantageously, the capacitor units EC2AV1 and EC2AV2 are disposed on one side of the stack of connection busbars, while the capacitor units EC2AM1 and EC2AM2 are disposed on the other side. The structure of the module is thus symmetrical, and the electrical conditions are equal for both switches. Thus, neither of them is at a disadvantage.

In FIG. 1, cell CL2 contains two switches T2 and T'2 and the capacitor C2. In the module shown in FIG. 2, the switches IT2 and IT'2 correspond to the switches T2 and T'2. To a certain extent, the capacitor element EC2AV corresponds to the cell capacitor C2 (further reference is made to this below). However, the capacitor element EC2AM has no counterpart in the cell CL2. It constitutes a fraction of the capacitance of the capacitor C1 of cell CL1 in FIG. 1.

It is also conceivable for cell CL1 to be implemented as shown in FIG. 2, in the form of a module having a downstream capacitor element similar to the downstream capacitor element EC2AV shown in FIG. 2. The sum of the capacitance of this element and of the capacitance of the upstream capacitor element EC2AM of the module shown in FIG. 2 constitutes the equivalent of the capacitor C1 in FIG. 1. In other words, the capacitance of the capacitor C1 has been subdivided into two portions, and one of the portions is in the form of the capacitor element EC2AM which, in the module shown in FIG. 2, acts to decouple the connection busbars IT2C2 and IT'2C2. Disturbing transient voltages generated by the inductance of the interconnection busbars BIAM1 and IAM2 are thus absorbed by the capacitor element EC2AM.

With reference again to the downstream capacitor element EC2AV, and for the same reasons as for the cell capacitor C1, the capacitance of the cell capacitor C2 is subdivided into two portions, and the capacitor element EC2AV also represents only a fraction of the capacitance of the capacitor C2.

The structure described with each module being provided with two switches flanked by two capacitor elements does not change the electrical circuit diagram of the converter, but it does make it possible to absorb disturbing transient voltages in the vicinity of the switches, and to preserve nominal operating conditions for them, so that, either the described modules can operate under higher rated voltages, thereby making it possible to reduce the number of modules, and therefore to reduce the cost of the converter, or else the modules can use switches rated for voltages that are lower, thereby also making a saving.

The capacitors C1, C2, . . . of the converter shown in FIG. 1 can be split up into capacitor elements such as EC2AM and EC2AV shown in FIG. 2 in various ways. From a practical point of view, the simplest way is to subdivide the capacitors into portions that are equal, i.e. to chose the fraction ½, throughout the converter. However, other fractions are conceivable. From cell to cell, the rated voltage of the capacitors increases, and therefore so does their volume. It is thus conceivable, technology permitting, to use different fractions, so as to reduce the number of modules having different volumes. For this purpose, it is necessary merely to ensure that the capacitance of the capacitor elements always remains high enough for them to guarantee protection against voltage surges.

Additionally, consideration is given below to the case when, in view of the rated voltage of the capacitor, the volume of a capacitor element becomes too large for he space available in a module of the converter.

FIG. 3 shows a converter CONV made up of a stack of modules MOD1, MOD2, MOD3, MOD4, each of which is similar to the module shown in FIG. 2, and therefore not otherwise described, the modules being connected in cascade by interconnection busbars BI2, BI3, BI4. As shown, and according to an additional characteristic of the invention, provision is made to connect an additional capacitor CA to the busbar BI4. This makes it possible to limit the volume of the capacitor elements EC3AM of the module MOD3 and EC4AV of the module MOD4.

As described above with reference to FIGS. 1 and 2, the cell capacitors are subdivided in order to limit voltage surges on the switches. It is also indicated, in the preamble of the present description, that the rated voltages of the capacitors are of increasing magnitude. For equal capacitance, the volume of a capacitor increases as the square of its rated voltage. It is easy to imagine that the cell capacitor whose capacitance is shared between the capacitor elements EC3AM and EC4AV could have an rated voltage that is so high that the volume of each of the capacitor elements, when the split is into equal halves and the elements are therefore of identical volume, or the volume of one of the capacitor elements, e.g. EC4AV, when the split is unequal, exceeds the space available in a standard module, i.e. in modules having the same dimensions. Adding the additional capacitor CA makes it possible to split the capacitance into three fractions, and to keep the volume of each of the capacitor elements EC3AM and EC4AV within the required limits.

Naturally, a similar additional capacitor may be provided elsewhere in the circuit for the same reasons. The limitation on the use of such additional capacitors is that the capacitor elements provided in the modules must retain sufficient capacitance to ensure that the effect of limiting the transient voltage surges is maintained within satisfactory limits.

What is claimed is:

1. A multilevel converter structure made up of cells in cascade, each intermediate cell containing two switches, with one pole of each of the two switches forming part of a pair of upstream poles and the other pole of each of the switches forming part of a pair of downstream poles, the pair of downstream poles of an upstream cell being connected to the pair of upstream poles of a downstream cell, the converter structure also having a respective capacitor for each cell, each capacitor being connected between the two poles constituting the pair of downstream poles of its cell, wherein said converter structure is made up of modules, among which at least an intermediate module contains an upstream capacitor element, in addition to two switches corresponding to the switches of an intermediate cell, the capacitance of said capacitor element being a fraction of the capacitance of the cell capacitor of said upstream cell, while a module upstream from said intermediate module contains a downstream capacitor element whose capacitance is a second fraction of the capacitance of the cell capacitor of said upstream cell.

2. A converter structure according to claim 1, wherein said first and second fractions are the same for all of the modules of the converter.

3. A converter structure according to claim 1, wherein all of said fractions are equal to ½.

4. A converter structure according to claim 1, wherein each of said capacitor elements is made up of a plurality of capacitor units.

5. A converter structure according to claim 1, wherein connection conductors of the switches are flat busbars and the flat busbars of the switches of a module are superposed on their large faces.

6. A converter structure according to claim 5, wherein said capacitor units are disposed against said stacked flat busbars.

7. A converter structure according to claim 1, wherein the modules are stacked and interconnected via interconnection flat busbars.

8. A converter structure according to claim 1, wherein, when said capacitance of a cell capacitor is such that a given capacitor element supplying a portion of said capacitance would have a volume exceeding the limits allowed by the required module dimensions, a portion of the cell capacitor capacitance is supplied in the form of an additional capacitor connected to the interconnection busbars coupled to said given capacitor element.

* * * * *